United States Patent
Catana et al.

(10) Patent No.: US 11,846,316 B2
(45) Date of Patent: Dec. 19, 2023

(54) ROLLING BEARING FOR HIGH SPEEDS EQUIPPED WITH AN OPTIMIZED CAGE TO REDUCE NOISE AT LOW SPEEDS

(71) Applicant: AKTIEBOLAGET SKF, Gothenburg (SE)

(72) Inventors: Leonardo Catana, Chieri (IT); Fabrizio Grasso, Treiso (IT)

(73) Assignee: Aktiebolaget SKF

( * ) Notice: Subject to any disclaimer, the term of this patent is extended or adjusted under 35 U.S.C. 154(b) by 0 days.

(21) Appl. No.: 17/847,244

(22) Filed: Jun. 23, 2022

(65) Prior Publication Data

US 2023/0003252 A1    Jan. 5, 2023

(30) Foreign Application Priority Data

Jun. 30, 2021 (IT) ........................ 102021000017096

(51) Int. Cl.
F16C 19/06    (2006.01)
F16C 33/38    (2006.01)

(52) U.S. Cl.
CPC .......... F16C 19/06 (2013.01); F16C 33/3806 (2013.01)

(58) Field of Classification Search
CPC ... F16C 19/06; F16C 33/3806; F16C 2208/90
See application file for complete search history.

(56) References Cited

U.S. PATENT DOCUMENTS

| | | | | |
|---|---|---|---|---|
| 5,553,949 A | * | 9/1996 | Fukuwaka | F16C 33/418 |
| | | | | 384/523 |
| 10,378,583 B1 | * | 8/2019 | Lin | F16C 33/6607 |
| 2011/0229067 A1 | | 9/2011 | Brown et al. | |
| 2013/0071056 A1 | * | 3/2013 | Sugita | F16C 19/163 |
| | | | | 384/445 |

FOREIGN PATENT DOCUMENTS

| | | | | |
|---|---|---|---|---|
| EP | 2610510 A1 | * | 7/2013 | .......... F16C 33/3856 |
| EP | 3744992 A1 | * | 12/2020 | ............ F16C 19/163 |
| EP | 3869054 A1 | * | 8/2021 | ............ F16C 19/163 |
| GB | 2286860 | | 8/1995 | |
| JP | S63167125 A | * | 7/1988 | |
| JP | 2001140870 | | 5/2001 | |
| JP | 2004301314 A | * | 10/2004 | .......... F16C 33/3843 |
| JP | 2011074999 | | 4/2011 | |
| JP | 2011117542 A | * | 6/2011 | |
| JP | 2011169370 A | * | 9/2011 | .......... F16C 33/3806 |

OTHER PUBLICATIONS

JP2004301314A_Description.*
Search Report for corresponding Italy Patent Application No. 2021000017096 dated Feb. 24, 2022.

* cited by examiner

*Primary Examiner* — Phillip A Johnson
(74) *Attorney, Agent, or Firm* — Reed Smith LLP

(57) ABSTRACT

A rolling bearing including an outer ring, an inner ring, rolling elements interposed between the outer ring and the inner ring and a cage for retaining the rolling elements and provided with radial seats or pockets for housing the rolling elements. The cage is guided supportingly on the outer ring with which a first clearance (G1) is defined, while between the pockets and the rolling elements there is a second clearance (G2) such that they have a relative ratio of between about 0.4 and 1. The rolling elements may be balls and the pockets may be formed by radial through-holes, which are circular or square in shape.

3 Claims, 3 Drawing Sheets

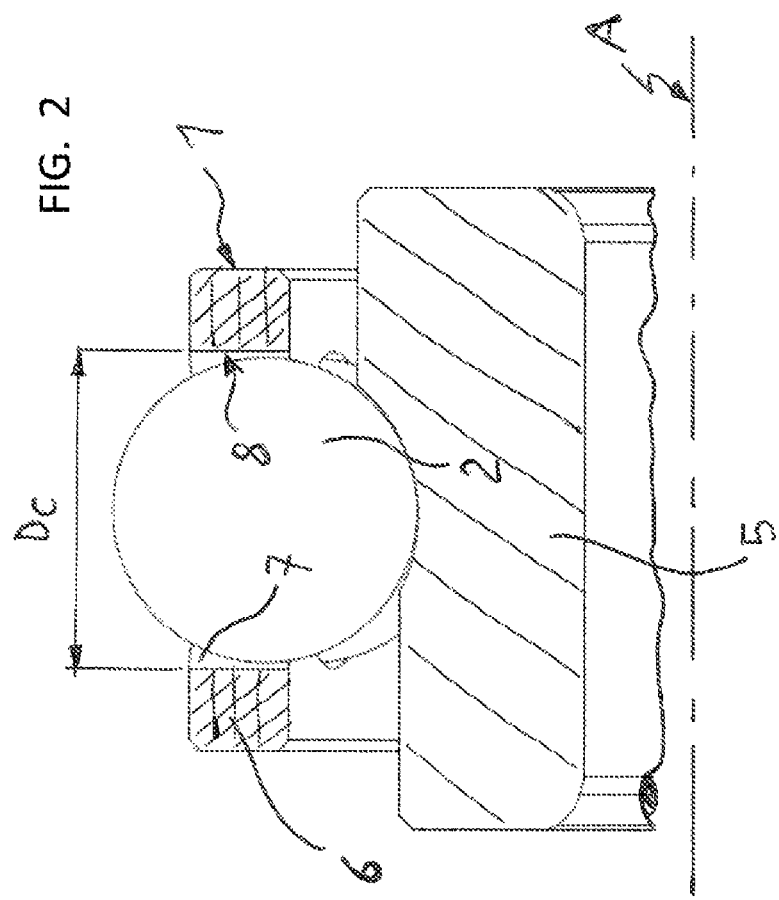
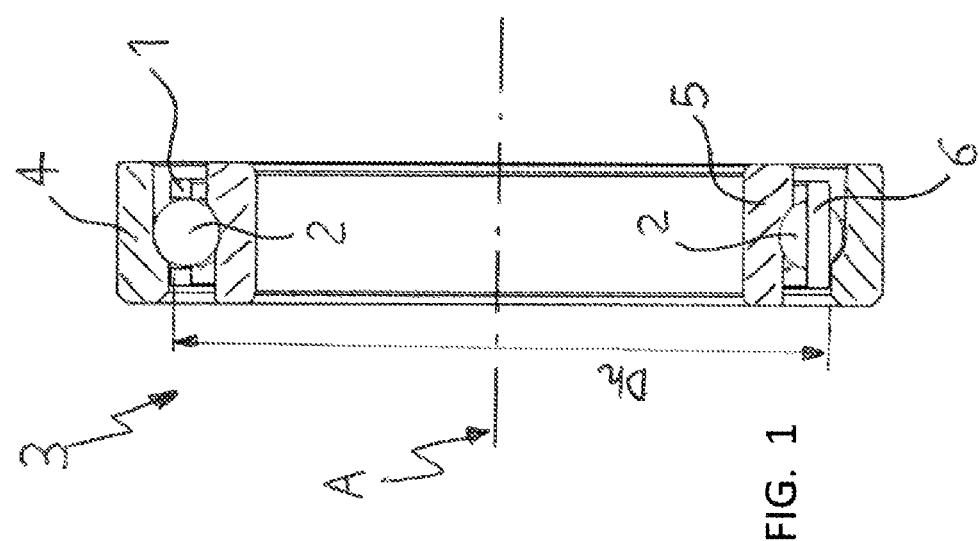

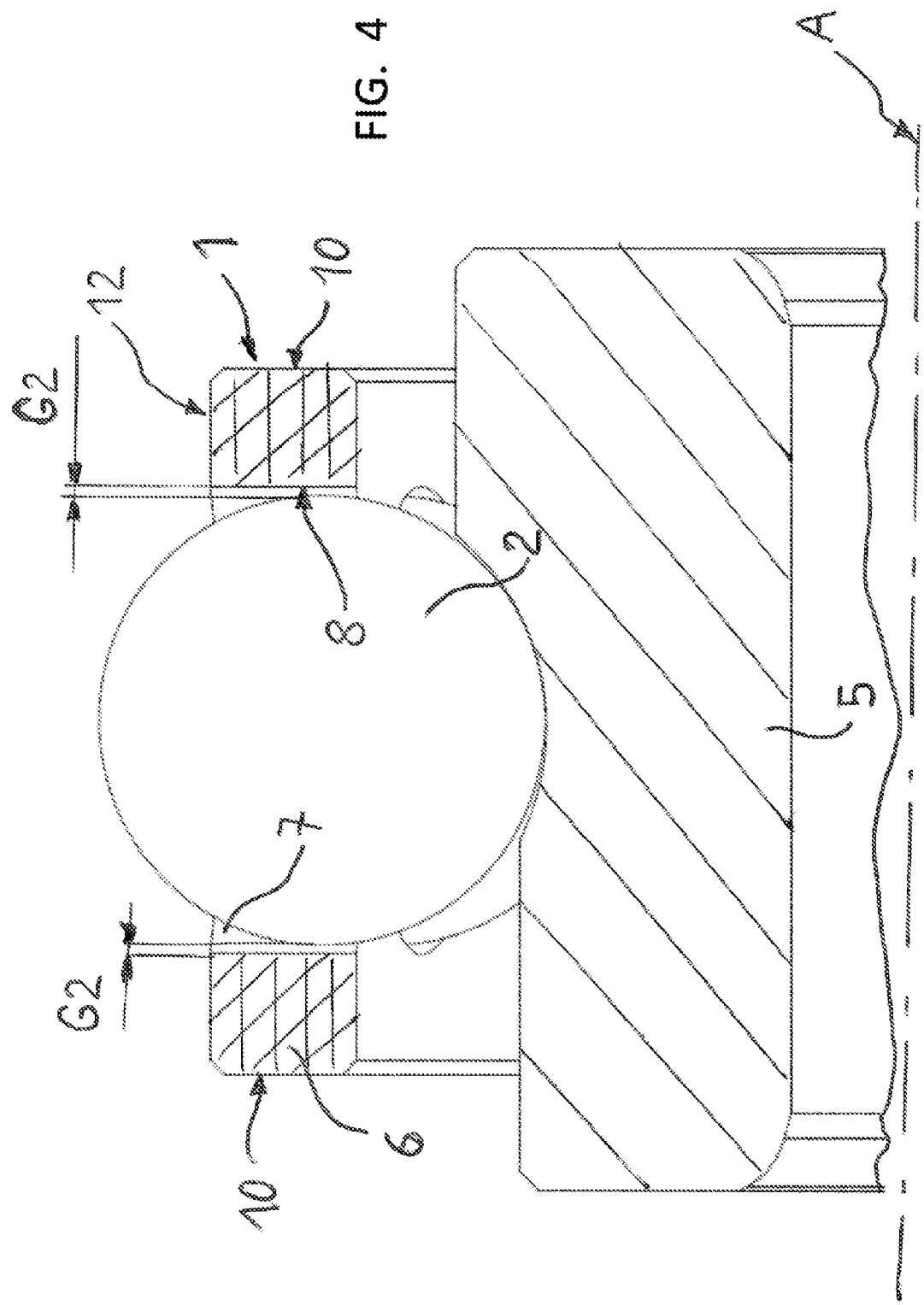

ROLLING BEARING FOR HIGH SPEEDS EQUIPPED WITH AN OPTIMIZED CAGE TO REDUCE NOISE AT LOW SPEEDS

CROSS-REFERENCE TO RELATED APPLICATIONS

This application is based on and claims priority to Italian Patent Application No. 102021000017096 filed on Jun. 30, 2021, under 35 U.S.C. § 119, the disclosure of which is incorporated by reference herein.

FIELD

The present disclosure relates to a rolling bearing designed to operate at high speeds and equipped with a retaining cage for the rolling elements which is optimized so as to reduce the noise at low speeds.

BACKGROUND

Here and below "high speed" is understood as meaning a rotational speed of the bearing comprised between speed factor values of the bearing ranging between 1.2 and 3 million ndm, while "low speed" is understood as meaning a rotational speed of the bearing with a speed factor of less than 600,000 ndm.

"Speed factor" or "ndm" is understood as meaning the product of the average diameter of a bearing, expressed in mm, multiplied by the rotational speed of the bearing (i.e. ring thereof rotating during use), expressed in revolutions/minute (rpm).

JP2011074999 discloses a rolling bearing comprising an outer ring, an inner ring and a plurality of rolling elements (balls) interposed between the inner ring and outer ring so as to render them relatively rotatable with low friction. The rolling elements are kept in the correct position by a cage including an annular body provided with a plurality of radial pockets or seats suitable for housing the balls. The cage is made entirely of a synthetic plastic material in which polyfunctional monomers have been inserted, these cross-linking during the molding process, thus improving the strength of the cage. This cage is guided, i.e. rotationally supported (subject to a relatively small predefined clearance), on the rolling elements; the cage therefore keeps the rolling elements in the correct position, ensuring smooth operation without any noise.

With regard to high-speed applications U.S. Pat. Pub. 2011/0229067 also discloses an annular cage which may be made of both pressed metal and plastic which is formed with a U-shaped cross-section and which guides the rolling elements only on the lateral flanks, leaving them free both radially on the outside and radially on the inside. However, such a cage may be effectively used only with rolling elements consisting of rollers.

BRIEF DESCRIPTION OF THE DRAWINGS

This disclosure will now be described with reference to the attached drawings which illustrate non-limiting exemplary embodiments of a bearing unit, in which:

FIG. 1 shows a radially sectioned right-angled elevation view of a rolling bearing provided according to embodiments of the disclosure;

FIG. 2 shows, on a larger scale, a radially sectioned elevation view of the rolling bearing according to FIG. 1 in which a radially outer ring, which is stationary during use, has been omitted for easier comprehension;

FIG. 4 shows, on a further enlarged scale, of a detail view of the rolling bearing of FIG. 2.

DETAILED DESCRIPTION

Figure 3:
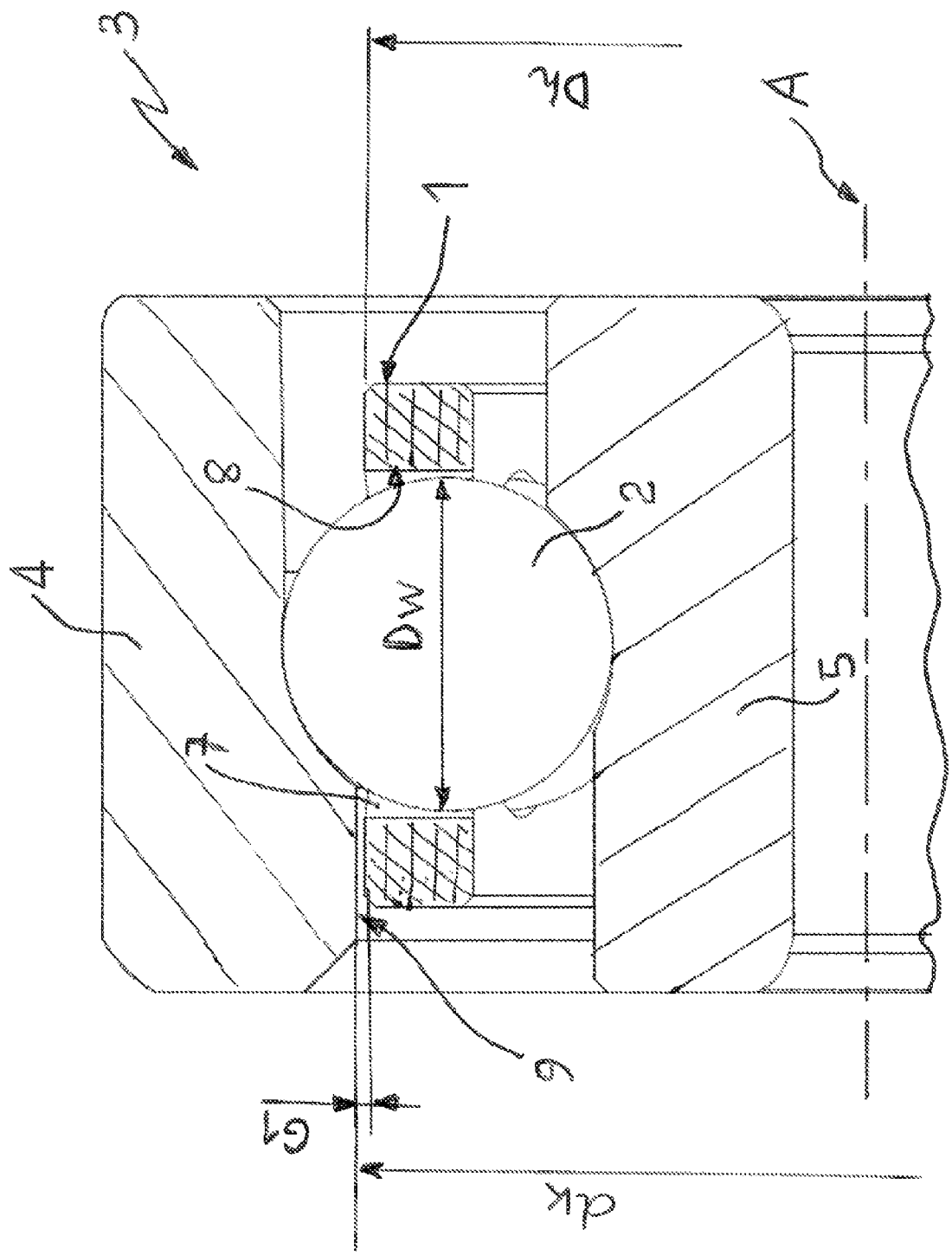
FIG. 3 shows a radially sectioned view, on a further enlarged scale, of a detail view of the rolling bearing according to FIG. 1.

In the case of high-speed applications (for example equal to or greater than 10-20,000 rpm) the friction which develops during use between balls and cage is excessive and increases, on the one hand, the energy consumption and, on the other hand, the internal temperature of the bearing, which may reach levels which are incompatible with a correct operational performance of the bearing.

In order to solve the problem of overheating, it is possible to provide a cage guided on the outer ring of the bearing, if this ring is the stationary ring. In this case, however, in particular at low speeds and during acceleration, the rolling elements are not kept perfectly in position and undesirable noise and vibrations are created.

An object of the present disclosure is therefore to overcome the drawbacks of the prior art and in particular to provide a rolling bearing provided with a cage which allows the rolling elements to be correctly retained, eliminating any noise at low speed, and which at the same time does not result in the generation of friction and temperatures which cannot be withstood at high speeds.

It is also an object of the present disclosure to provide a rolling bearing of the aforementioned type which is designed for high-precision and high-speed applications.

In accordance with the present disclosure, therefore, a high-speed precision rolling bearing is provided, as defined in the accompanying claims.

With reference to FIGS. 1 to 4, reference number "1" denotes in its entirety a high-speed precision rolling bearing 3. The rolling bearing 3 comprises an outer ring 4, which is stationary during use, an inner ring 5, rotating during use, a plurality of rolling elements 2 interposed between the outer ring 4 and the inner ring 5 so as to render the same relatively rotatable with low friction, and a cage 1 for keeping the rolling elements 2 in the correct position.

The cage 1 may be made as one or unitary piece by molding a synthetic plastic material and is defined preferably by a single annular body 6 having an axis of symmetry A (FIG. 1), arranged during use coaxially between the outer ring 4 and the inner ring 5 and may be provided annularly with a plurality of radial through-seats or through-pockets 7 which are each suitable for housing a respective rolling element 2.

According to one aspect of the present disclosure, the seats 7 are each defined/formed by a simple radial through-hole with a circular profile and are therefore defined internally by respective cylindrical side surfaces 8 radially arranged annularly around the axis A.

The cage 1 may be made as one piece from a synthetic plastic material, for example by injection molding, so that it is formed by a single annular body 6 provided radially with seats or pockets 7.

According to an aspect of the present disclosure, the annular body 6, and therefore the entire cage 1, may be made of a phenolic resin.

Furthermore, the annular body 6 may be defined axially between two opposite end faces 10 thereof (FIG. 4).

According to a further aspect of the present disclosure, the rolling elements 2 may be formed by balls and the cage 1 may have a single ring of seats or pocket 7 for the balls 2.

According to a further aspect of the present disclosure, the cage 1 may be designed with dimensions such that the annular body 6 has a radially outer diameter Dh (FIG. 1) so as to define between the annular body 6 and a radially inner side surface 9 (FIG. 3) of the outer ring 4, a first predefined clearance G1, which is radially directed and configured to guide supportingly, during use, the cage 1 on the outer ring 4, in particular against the radially inner cylindrical side surface 9 of the outer ring 4 which acts as a shoulder surface for the cage 1 and which has an inner diameter dk.

Here and below, the term "guide supportingly" indicates the situation where the cage 1 is supported during rotation of the bearing 3 so that its radial position remains substantially constant.

In particular, the cage 1, and therefore the annular body 6, may be defined towards the outer ring 4 by a radially outer cylindrical side surface 12 (FIG. 4).

The radial clearance G1 may therefore be defined between the side surfaces 9 and 12.

According to another aspect of the present disclosure, between the seats or pockets 7 and the rolling elements 2 there may be a second predefined axially directed clearance G2 towards each end face 10 of the annular body 6.

According to an aspect of the present disclosure, and in combination with the fact that the rolling elements are balls, the clearances G2 and G1 have dimensions, i.e. are such that a first numerical ratio "c", which according to the present disclosure may be between about 0.4 and 1, is defined between them.

In particular, in the case were the seats or pockets 7 are formed by simple cylindrical radial holes, as in the non-limiting example shown, this numerical ratio c is defined by the following formula:

$$c = (Dc - Dw)/(dk - Dh) \quad [1]$$

where:
Dc is the diameter of the radial holes forming the seats or pockets 7 (FIG. 2);
Dw is the diameter of the balls forming the rolling elements 2 (FIG. 3);
dk is the radially inner diameter of the outer ring 4;
Dh is the radially outer diameter of the annular body 6.

The seats or pockets 7 therefore have a first predefined diameter Dc, while the rolling elements have a second predefined diameter Dw.

According to a possible embodiments of the present disclosure, not shown for simpler illustration, the seats or pockets 7 may also have a square shape, i.e. a shape which is formed by square-base prismatic radial holes, instead of cylindrical radial holes, since in this case also the parameter c may be defined, where in the formula [1] shown above Dc is not the diameter of a circular hole, but the measurement of the side of the square-base hole forming in this case the pocket or seat 7.

According to the present disclosure, in combination with the first numerical ratio c, the first and second predefined diameters Dc and Dw may be such that between them a second numerical ratio "k" is defined, whereby said ratio, according to the present disclosure, may be between about 1.03 and 1.08.

The second numerical ratio k may therefore defined by the following formula:

$$k = Dc/Dw \quad [2]$$

where Dc and Dw are, respectively, the inner diameter of the radial holes 7 forming the seats or pockets housing the rolling elements 2, and the outer diameter of the balls 2 forming the said rolling elements.

This parameter k may also be calculated in the case where the seats or pockets 7 have a square shape, i.e. are formed by square-base prismatic radial holes, instead of by cylindrical radial holes. In this case, in the formula [2] shown above, Dc will not be the diameter of a circular hole, but the measurement of the side of the square-base hole forming in this case the pocket or seat 7 which contains a ball 2 with an outer diameter Dw.

Keeping within the dimensional parameters indicated above and operating in combination with a cage 1, which is able to supportingly guide the rolling elements 2 since the seats 7 are cylindrical or prismatic holes with a diameter/side greater than that of the balls forming the rolling elements 2, it has been experimentally determined that the cage 1 is always guided supportingly on the outer ring 4, during stationary use, against the shoulder side surface 9, resulting in a small amount of friction on the balls 2 and therefore energy savings and low heat production, but at the same time there is no noise of any kind at low speeds (ndm less than or equal to 600,000).

This latter aspect has proved to be very important for the end users, since noisiness at low speed, even though it has no practical consequences, gives the impression that the entire rolling bearing 3 has a low operational quality, something which instead is not the case.

In addition to the embodiments of the disclosure, as described above, it is to be understood that numerous further variants exist. It must also be understood that said embodiments are only examples and do not limit either the scope of the disclosure, nor its applications, nor its possible configurations. On the contrary, although the description provided above enables the person skilled in the art to implement the present disclosure at least in one of its exemplary configurations, it must be understood that numerous variations of the components described are feasible, without thereby departing from the scope of the disclosure, as defined in the accompanying claims, interpreted literally and/or in accordance with their legal equivalents.

We claim:
1. A high speed rolling bearing, comprising:
an outer ring rotatable with respect to an axis of symmetry (A);
an inner ring;
a plurality of rolling elements interposed between the outer ring and the inner ring; and
a cage configured for retaining the rolling elements, wherein the cage comprises an annular body coaxially disposed between the outer ring and the inner ring, wherein the cage is defined between opposite end faces thereof and is provided annularly with a plurality of radial through-seats, or through-pockets, each radial through-seat is configured for housing a respective rolling element;
wherein, a first predefined clearance (G1) is provided radially between a radially outer diameter (Dh) of the annular body and a radially inner side surface of the outer ring, and configured to guide supportingly, during use, said cage on the outer ring;
wherein a second predefined clearance (G2) is provided towards each end face of the annular body axially between the rolling elements and the radial through-seats or through-pockets;

wherein, a first numerical ratio (c) between the second predefined clearance (G2) and the first predefined clearance (G1) is between about 0.4 and 1;

wherein the rolling elements are balls and the radial through-seats or through-pockets comprise circular or square radial through-holes formed through the body of the cage;

wherein the first numerical ratio (c) is defined by:

$$c = (Dc - Dw)/(dk - Dh)$$

where:
Dc is the diameter or side of the radial holes comprising the radial through-seats or through-pockets;
Dw is the diameter of the balls comprising the rolling elements;
dk is the radially inner diameter of the outer ring;
Dh is the radially outer diameter of said annular body;

wherein the radial through-seats or through-pockets have a first diameter or side with predefined dimensions (Dc), wherein the rolling elements have a second predefined diameter (Dw); said first diameter or side and said second predefined diameter being configured such that a second numerical ratio (k) which is between about 1.03 and 1.08 is defined between them;

wherein the second numerical ratio (k) is defined by:

$$k = Dc/Dw$$

wherein Dc and Dw are, respectively, the inner diameter of the circular radial holes or the side of the square radial holes comprising the seats or pockets and the outer diameter of the balls comprising the rolling elements.

2. The rolling bearing of claim 1, wherein the cage comprises a unitary piece of molded synthetic plastic material.

3. The rolling bearing of claim 2, wherein the cage comprises a phenolic resin.

* * * * *